United States Patent [19]

Korth

[11] Patent Number: 4,866,694
[45] Date of Patent: Sep. 12, 1989

[54] READ/WRITE HEAD FOR OPTICAL DISKS

[75] Inventor: Hans E. Korth, Stuttgart, Fed. Rep. of Germany

[73] Assignee: International Business Machines Corporation, Armonk, N.Y.

[21] Appl. No.: 940,670

[22] Filed: Dec. 11, 1986

[30] Foreign Application Priority Data

Dec. 17, 1985 [EP] European Pat. Off. ........ 85116116.6

[51] Int. Cl.[4] ........................... G11B 7/12; G02B 6/10
[52] U.S. Cl. .................................... 369/110; 369/112; 369/120; 369/45; 350/96.18
[58] Field of Search ......................... 350/96.11–96.14, 350/96.18; 369/13, 97, 121, 112, 120, 122, 44–46; 360/59, 114; 365/122

[56] References Cited

U.S. PATENT DOCUMENTS

| | | | |
|---|---|---|---|
| 4,298,974 | 11/1981 | Tsunoda et al. | 369/45 |
| 4,410,277 | 10/1983 | Yamamoto et al. | 360/114 |
| 4,599,714 | 7/1986 | Endo | 369/110 |
| 4,652,737 | 3/1987 | Kowalski et al. | 369/45 |
| 4,718,052 | 1/1988 | Kondo et al. | 350/96.18 |
| 4,721,368 | 1/1988 | Deguchi et al. | 369/110 |
| 4,747,090 | 5/1988 | Yamashita et al. | 369/112 |

FOREIGN PATENT DOCUMENTS 3534776 4/1986 Fed. Rep. of Germany .

OTHER PUBLICATIONS

Lean et al., *Integrated Optical Read-Write Head*, IBM Technical Disclosure Bulletin, vol. 15, No. 5, p. 2630, Jan., 1973.
E. G. Lean, IBM Technical Disclosure Bulletin, vol. 23, No. 7A, Dec., 1980, pp. 2994–2995, "Flying Optical Head for Disc Applications".

*Primary Examiner*—Alan Faber
*Assistant Examiner*—James E. Tomassini
*Attorney, Agent, or Firm*—Stephen J. Limanek; Mark F. Chadurjian

[57] ABSTRACT

In an optical storage system where an information bearing surface moves relative to a read/write head the latter includes a transparent body in which light beams sent to and from the surface are guided by multiple internal reflections. Beam shaping and focussing is effected by optical elements integrated in the surface of the body at the locations where the internal reflections occur. A distortion free imaging system is obtained with two series-arranged aspheric reflection surfaces which focus the beam on the information bearing surface. The separation of the input and the reflected beam paths is achieved with a polarizing beam splitter and an associated quarter-wave layer. For readout of a magneto-optic information bearing surface a nonperfect polarizing beam splitter is used in connection with a differential detection scheme to increase the signal to noise/ratio.

7 Claims, 4 Drawing Sheets

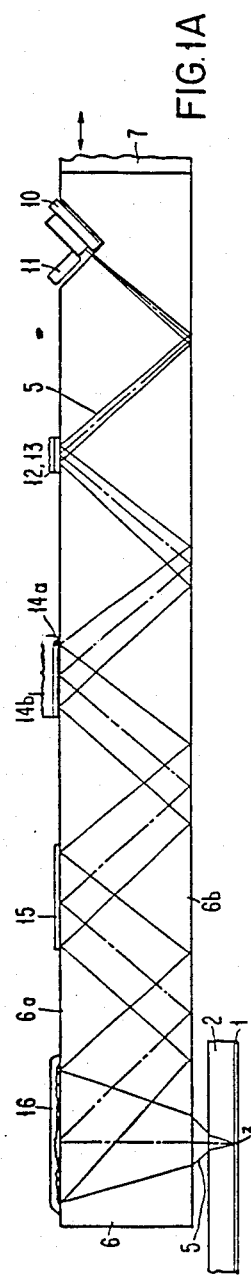
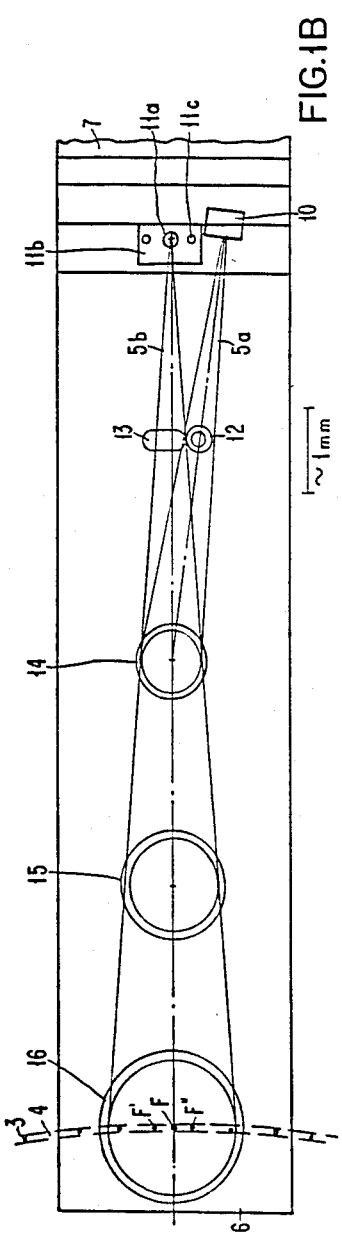
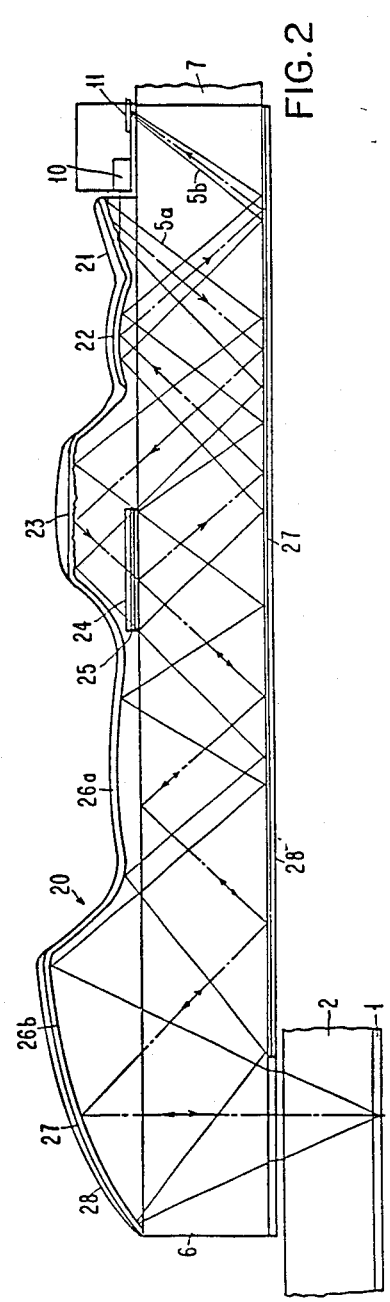

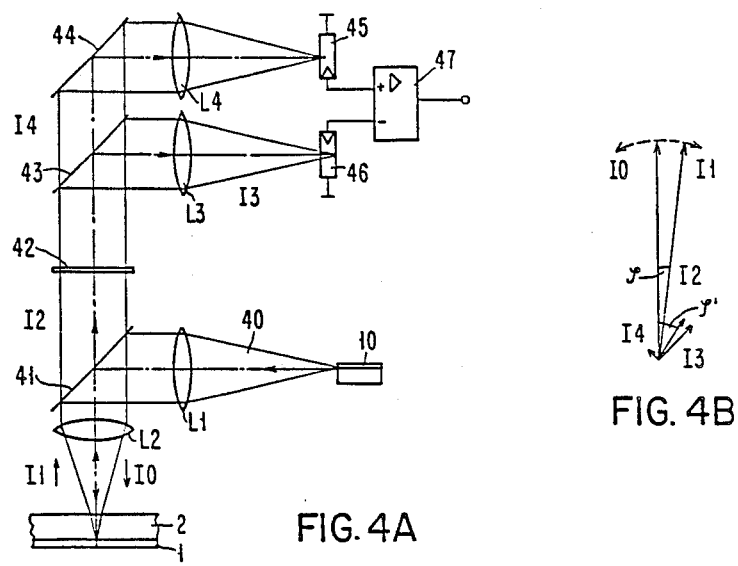
FIG. 4A
FIG. 4B
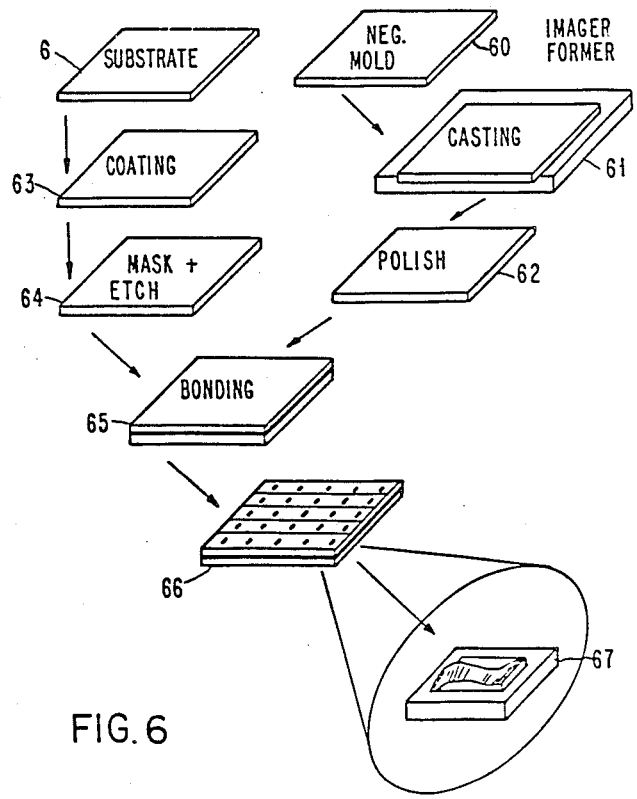
FIG. 6

READ/WRITE HEAD FOR OPTICAL DISKS

DESCRIPTION

1. Technical Field

The invention relates to a read/write head for optical disks and to a method of manufacture for such heads.

2. Background Art

Optical disks are storage media where information is recorded by a modulated light beam on a movable surface in the form of indicia (or spots) that are arranged along tracks and whose optical characteristics can be detected by a readout light beam. The high storage density achievable with these optical disks is interesting both for digital and non-digital recording; the latter has already found widespread use in the form of video disks.

The individual recording indicia have a typical diameter of about 1 μm. An example of such indicia are small pits that are burnt by the writing laser into the surface of the disk to change its local reflectance. Generation and readout of such pits (or other optical discontinuities) requires focussing and track control of the laser beams with micrometer accuracy or even better. As optical systems for focussing a beam to a micrometer spot have very small depth of field, the height (or the working distance) of the optical system above the information area on the disk surface has also to be controlled very closely.

In known optical disk systems focussing, height and position control of the laser beams are achieved by optical systems that consist of discrete elements (lenses, mirrors, etc.) in combination with elaborate electronic control systems and mechanical actuators for vertical and lateral displacements. Such optical beam guidance systems tend to be rather bulky, expensive and difficult to adjust. Their great inertia further forbids rapid displacements and requires strong actuators.

A typical example of such known optical heads can be found in DE-A-2918931 U.S. Pat. No. 4,298,974, filed May 10, 1979, and issued Nov. 3, 1981, where beam focussing is achieved by displacing an objective lens mounted in an electromagnetic coil.

The complexity and the mass of these optical heads are in contrast to the read/write heads used in magnetic disks, which are of simple design, can be mass-fabricated and keep a predetermined distance above the disk by flying on an air cushion. An optical disk whose design is based on the same principle has been proposed by E. G. Lean in IBM Technical Disclosure Bulletin, Vol. 23, No. 7A, December 1980, pp. 2994–2995, wherein the optical read/write disk is aero-dynamically shaped to fly over the disk surface. Input and output is achieved by optical fibers and wave guides within the slider to direct the light to and back from the surface of the optical disk. The use of optical fibers limits the flexibility of this head and complicates its manufacture. Additionally optical imaging is only of moderate quality. If additional fibers are required, e.g., for auxiliary beams to control the position of the head, the complexity of this head is further increased.

Another drawback of this proposal includes the small working distance of a fibre optical system which requires a very small distance between the disk and the head and, thus, leads to increased sensitivity against dust.

DISCLOSURE OF THE INVENTION

It is, therefore, an object of the present invention to provide an optical read/write head of the aforementioned kind with excellent optical imaging qualities, small dimensions, little weight, low cost and generalized applicability in optical imaging systems. In addition, a method of manufacturing such heads is provided as well as a method of reading out magneto-optic media that is particularly suited for such heads.

The read/write head in accordance with the teachings of this invention is a compact, flat, one-piece arrangement that can be easily fixed to an actuator arm and used with one or several stacked optical disks. The optical beams are guided exclusively in the interior of the head so that no readjustment of the beam path is necessary and the sensitivity to dust reduced. The optical elements to shape and to control the beams are provided at the surface of the optical head and can be manufactured with known techniques, e.g., photolithographic methods or molding, in batch mode where the individual heads are separated only in the last processing step. The low inertia of an individual head allows rapid displacements, e.g., during track search, and the low manufacturing cost permits the use of such high quality heads even in entertainment devices such as video disks.

Preferred embodiments of the invention will now be described in detail with reference to the accompanying drawings.

BRIEF DESCRIPTION OF THE DRAWINGS

FIGS. 1A and 1B illustrate a first embodiment of the present invention in cross sectional and top views, respectively, wherein optical beam guidance elements are applied on a flat surface of a transparent substrate, FIG. 2 illustrates a second embodiment of the present invention wherein the beam guidance elements are realized in a plastic form part that may be attached to a flat transparent substrate, FIGS. 4A and 4B illustrate the principal beam path and the polarization vector diagram, respectively, with an optical arrangement to read-out magnetically coded information from an optical disk, FIG. 6 is a schematic representation of the manufacturing steps for making the read/write head of FIG. 2.

BEST MODE FOR CARRYING OUT THE INVENTION

Figure 3A:
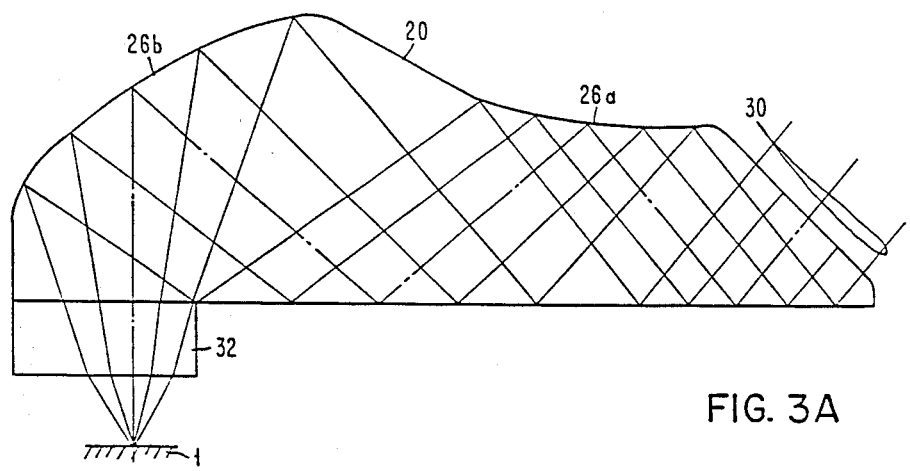
FIGS. 3A and 3B illustrate an enlarged cross section of the beam focussing element in the form part of FIG. 2 and an isometric view of calculated ray paths in the focussing element, respectively.

In the following discussion of the figures of the drawings like reference numerals refer to corresponding elements of the invention. Referring to the drawings in more detail, FIGS. 1A and 1B illustrate an embodiment of the invention in cross-sectional and top views, respectfully, wherein the optical read/write head includes simply a slab-like transparent substrate with the beam guidance elements applied to the plane top. An information bearing surface 1 of the optical disk 2 carries optical discontinuities 3, e.g., pits, along tracks 4 which are to be scanned by a focussed light beam 5, preferably, a monochromatic laser beam. The surface 1 is preferably, arranged at the bottom surface of the transparent optical disk 2 to reduce the sensitivity of the system to dust particles.

Beam 5 exits as a convergent beam from one end of transparent substrate 6. It is generated at the opposite end of the substrate 6 by a laser 10 which may be obliquely oriented in a kerf cut into the upper surface of the substrate 6. The entire light path of the beam from the laser 10 to its exit over the optical disk 2 is located within the transparent substrate 6, which guides the oblique beam by multiple internal reflections. Optical elements to influence and to shape the beam are applied on the external surface of the substrate 6 at locations where the internal reflections occur. These elements can be used on both external surfaces 6a and 6b of the substrate 6, or, for ease of manufacturing, only at one surface 6a. In particular the following elements may be provided in the light path starting at laser 10:

- A zone plate or hologram lens 12 that acts as a cylindrical mirror to compensate for the generally elongated shape of the beam leaving the laser 10;
- A polarizing beam splitter 14a on top of which a grating 14b is arranged to split beam 5 into a main beam and two auxiliary beams which are symmetrically offset with respect to the main beam and are focussed in F' and F", respectively, on track 4 in front of and behind the focus F of the main beam. Grating 14b is blazed such that the diffracted beams travel parallel to each other in the direction corresponding to the regular reflection of the beams at the upper surface 6a;
- A quarter wavelength layer 15 to polarize the beams circularly; such a layer can be obtained by isotropic sputtering; and
- A zone plate 16 (or a hologram lens) which reflects the beam 5 in the direction normal to substrate surface 6a and focuses it on information bearing surface 1 of the optical disk 2.

The focussed exit beam 5 is reflected at the information bearing surface 1 and travels back via the zone plate 16 to the quarter wavelength layer 15 which retransforms the circular polarization to a linear polarization that is perpendicular to the polarization of the original laser beam. The polarizing beam splitter 14a will thus divert the reflected beam from the axis of laser beam 5a into beam 5b which passes a zone plate 13 (acting as a cylinder lens) to be focussed on a four-quadrant detector 11, arranged in the kerf together with the laser 10. The auxiliary beams for track servo control are directed to further photodiodes 11b and 11c. Servo signals are generate from the outputs of the four-quadrant photodiode detector 11 and the auxiliary photodiodes 11b and 11c and processed in the conventional way to derive control signals for a head actuator symbolically shown at reference numeral 7.

In this embodiment the optical elements 12-16 are applied directly to the surface 6a of the substrate 6 by conventional techniques like evaporating, sputtering and etching and the zone lenses or holographic elements are defined with conventional methods, e.g., by directing beams that correspond to the desired entry and exit beams to a photosensitive plate as object or reference beams or by using synthetic hologram lenses. Laser 10 and photodiodes 11 could also be manufactured directly on the substrate or be discrete elements that are fixed to the substrate, e.g., with resins of matched indices. The back surface of substrate 6b can be covered with a reflecting layer and both surfaces can be covered with an additional protecting layer.

The height of the substrate 6 over the optical disk 2 can be either controlled via the actuator 7 or in the manner of magnetic read/write heads by shaping the lower surface 6b (or part of that surface) as an air foil to control the flight height automatically. In that case the arm of the actuator 7 must be flexible to allow for automatic height adjustments. The substrate 6 itself is rigid and may include glass, quartz or plastic material. Typical dimensions of the substrate are 11×3×1.5 mm.

Aerodynamic height control is, however, only advisable in dust free environments, as the distance between the head and the disk is very small. Greater clearance (circa 1 mm) is obtained by known optical servo control methods which can be easily incorporated in the heads proposed here.

In an alternative embodiment of the subject invention the particular elements 12-16 and the kerf for laser 10 and photodiode assembly 11 are not directly formed on a surface of a substrate but in a separate part, e.g., a transparent plastic body which is then fixed to the upper surface of a plane substrate. The optical elements like gratings, zone plates, catadioptric lenses, etc., can be made in the form part by molding or etching, with appropriate dies, etc.

FIG. 2 shows an example of this preferred embodiment of the invention with a form part 20, e.g., molded plastic, whose flat bottom surface is fixed without optical discontinuity to the top surface of transparent substrate 6. The illuminating light beam 5a that is to be focussed on information bearing surface 1 exits from laser 10 in a horizontal direction and is deflected by an optical grating 21 at the surface of form part 20 that simultaneously deflects the laser beam into the substrate 6 and corrects for its original elongated cross section. Optical gratings with these features are known in the art. After a first reflection on the bottom surface of substrate 6, the illuminating beam 5a reaches a dome-shaped part 23 of form part 20 with a further grating at its top that is blazed to reflect the illuminating beam back to the substrate and to generate the two auxiliary beams for track servo purposes. The reflected beams pass a polarizing beam splitter 24 which is located on top of a quarterwave-length plate 25 at the interface between substrate 6 and form part 20. The beam is then reflected at a first and a second aspherical reflector 26a and 26b which form an imaging system that focuses the beam on the information bearing layer 1 of optical disk 2.

The beam reflected at information bearing layer 1 reaches again the first and the second aspherical reflectors 26a and 26b from which it exits as a parallel beam whose plane of polarization will be perpendicular to the plane of polarization of the incident beam when it has passed again the quarterwave-length coating or plate 25 before being reflected at polarization beam splitter 24. The reflected beam then reaches reflector 22 (e.g., in the form of a toroid) which compensates for the different optical path length from the laser (in the incident beam) and to the photodetector element (in the reflected beam). In addition, reflector 22 introduces an artificial astigmatism that allows it to generate a servo signal from the four-quadrant photodiodes 11 to be used for automatic focus control.

For increased reflection efficiency the form part 20 and the bottom surface of substrate 6 may be covered with a reflective coating 27 and a protective coating 28.

For high optical quality the substrate and the form part should include optically matched materials showing no birefringence and having the same thermal expansion. Appropriate material combinations could be glass-glass, plastic-plastic or glass-plastic.

The use of a separate form part 20 has several advantages with respect to the embodiment of FIG. 1 where all of the beam shaping elements are directly applied to the upper surface of substrate 6. The most important aspect is that the two aspherical reflectors 26a and 26b provide an aberration free aplanatic imaging element for optimal transmission between the laser light source and the photo detector assembly. A second advantage of the beam path in FIG. 2 is that the laser and the photo detector assembly can be arranged in a common housing on the substrate. The reflector/beam shaper 21 and the reflector 22 can be formed easily in the form part 20 so that no kerf is required in substrate 6.

The embodiment of FIG. 2 can also be realized in a homogeneous body without a separate substrate. In this case optical elements shown in FIG. 2 at the interface between the substrate 6 and form part 20 can be placed into the relief surface or at the plane lower surface.

The exact shape of the aspherical reflectors 26a and 26b can be calculated from geometrical optics by tracing individual rays in the embodiment of FIG. 2 and observing the following conditions: constancy of the light path between two conjugate planes, laws of reflection and refraction, and sine condition.

The surfaces of the two reflectors can then be expressed analytically by polynomials of the form $$y(x,z) = \sum_{i}\sum_{j}^{NN} a_{ij} \cdot x^i \cdot z^j.$$

The x, y-plane is the symmetry plane and contains the optical axis so that $a_{ij}=0$ for odd j. Sufficient optical quality is obtained for $i+j \leq 9$, i.e., for polynomials of up to the $9^{th}$ degree.

Figure 3B:
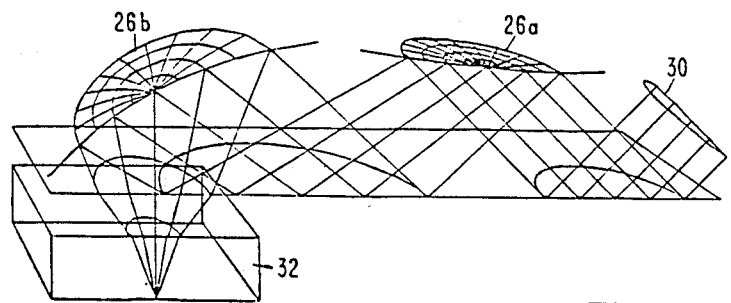
Figure 5A:
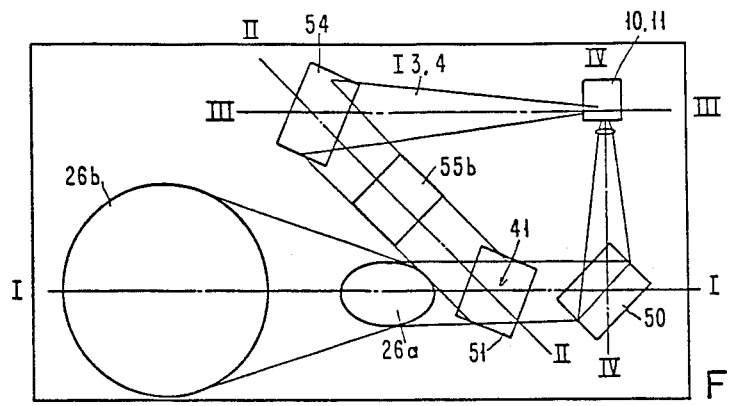
FIG. 5A illustrates a third embodiment of the present invention wherein the read-out scheme of FIG. 4A is incorporated in the beam guidance elements of FIG. 2, FIGS. 5B–5E illustrate cross-sections of the embodiment of FIG. 5A along various axes.
Figure 5B:
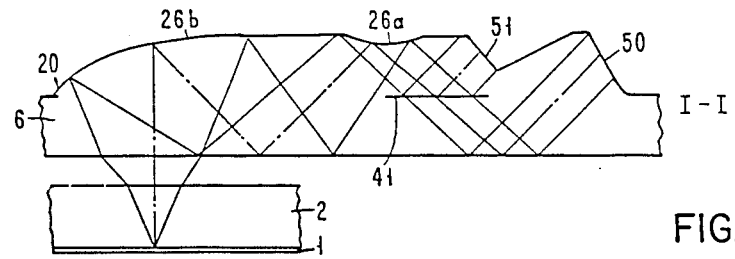
Figure 5C:
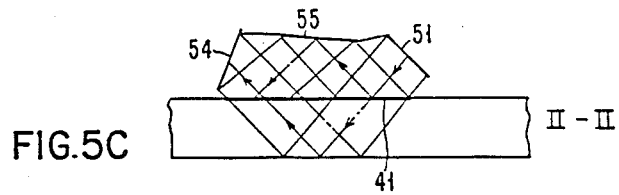
Figure 5D:
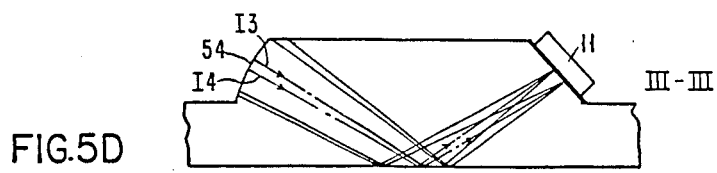
Figure 5E:
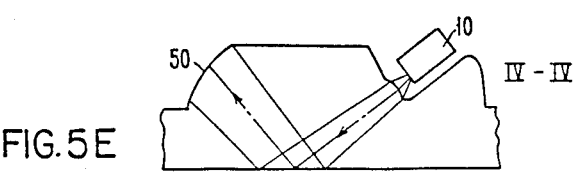

It has been shown that an aplanatic imaging system can be obtained with two reflectors 26a and 26b. FIGS. 3A and 3B show a cross-section and an isometric view, respectively, of the image forming part in the optical read/write head with calculated ray paths for a telecentric entry beam 30. Such a beam can be made available in the embodiment of FIG. 2 by appropriate elements in the remaining parts of the optical path. If white light is used instead of a monochromatic laser, an achromat compensator plate 32 has to be added at the exit plane of the imaging element in FIG. 3.

A very simple optical system with reduced optical quality uses an ellipsoid for surface 26b and a plane mirror for surface 26a.

The optical read/write held described above can be used for all storage media where information is recorded by small spots or indicia on the information bearing surface that differ in their reflectivity from their environment. For magneto-optical storage media, however, the polarization state of the readout beam is affected rather than its intensity by indicia having their magnetization reversed with respect to their neighborhood. In this case the design of the proposed optical read/write head must ensure that the polarization directions of the optical beams are not changed by oblique reflections at non-plane surfaces. This condition is satisfied by the above-described imaging system with two aspheric reflecting surfaces.

Known magneto-optical materials yield, however, only rather small changes of the polarization direction and render it difficult to obtain acceptable signal/noise ratios in the readout signal. It is, therefore, proposed to modify conventional readout schemes for magnetic optical media by an arrangement that is schematically shown in FIGS. 4A and 4B and whose implementation in an integrated optical read/write head is illustrated in FIGS. 5A-5E.

In FIG. 4A a magneto-optical information bearing surface 1 (the magnetization direction is perpendicular to the surface) on an optical disk 2 is illuminated by a light beam 40 from laser 10 through lens L1, beam splitter 41 and lens L2. Beam splitter 41 is a non-perfect polarizing beam splitter such that only a fraction of the beam with intensity I1 is transmitted, which was reflected at surface 1. This fraction in the order of 10% is designated by I2 and passes a plate 42 that rotates the polarization direction by 45° to impinge on (perfect) polarizing beam splitter 43 and mirror 44 which deflect the beam intensities I3 and I4 to lenses L3 and L4, respectively, for focussing on photodiodes 46 and 45, respectively. The outputs of these photodetectors are connected to a differential amplifier 47.

The non-perfect polarizing beam splitter 41 can be obtained by reducing the number of layers in a conventional multilayer polarizing beam splitter.

FIG. 4B shows the polarization diagram with the intensities Ii and the polarization directions of the various partial beams of FIG. 4A. The nonperfect polarizing beam splitter 41 operates to increase the polarization angle of I2 with respect to the conventional polarization angle of the total intensity I1 reflected at layer 1. Intensity I2 is then decomposed by polarizing beam splitter 43 and mirror 44 into components I3, I4 along axes oriented under 45° to $I_1$. This decomposition makes the output signal of differential amplifier 47 symmetrical to zero and insensitive to all disturbances that do not rotate the polarization plane. The signal/noise ratio of this signal corresponds to a conventional read-out setup for magneto-optical media using at least an eight fold laser power.

FIGS. 5A-5E show an integrated optical read/write head for magneto-optical materials where the optical elements of FIG. 4A are integrated in a form part 20 fixed to a plane parallel substrate 6. The elements in FIGS. 5A-5E corresponding to the optical components in FIG. 4A carry the same reference numerals, but have a dash added. FIGS. 5B-5E show cross sections along the axes denoted by Roman numerals in FIG. 5A.

The exit beam of laser 10 in a kerf of form part 20 is deflected by a concave reflector 50, passes nonperfect polarizing beam splitter 41 and is imaged by aspherical reflectors 26a and 26b to recording layer 1. The reflected light travels back along the same optical path and is partially reflected by non-perfect polarizing beam splitter 41 to a plane mirror 51, which is arranged above the nonperfect polarizing beam splitter 41 and reflects the beam back to the beam splitter 41 in the direction of axis II—II.

The orientation of mirror 51 is such that it simulates, together with beam splitter 41, the 45° rotator in FIG. 4A. The two intensities I3 and I4 are generated by reflecting the partial beams generated by beam splitter 41 at a further plane mirror 55 and the back plane of the substrate, respectively, and by recombining the beams under a slight angle before they are deflected by a mirror 54 to photodetectors 11. The mirror 54 can be either concave to focus the beams on the detectors or, if plane, be combined with image forming elements in the optical path.

The form part 20 can easily be mass produced by precision molding with a mold form that incorporates several of these heads. The mold form itself can be derived from an original mold that is manufactured with high precision, e.g., by electro erosion. After the molding process the individual heads need only be separated, glued to the substrate and equipped with the laser/photodetector assembly. The latter step is the only one requiring exact adjustment before the electronic assembly is rigidly fixed on the head. For efficient cooling the housing of the electronic assembly can be thermally connected with an actuator arm.

FIG. 6 indicates schematically the manufacturing steps for the read/write head of the present invention. In a first step the substrate 6 is prepared with plane and parallel surfaces. Each optical element at the interface between the substrate and form part is generated by depositing an appropriate layer with the desired optical characteristics (quarter wavelength layer or beam splitter layer), followed by a photolithographic etch process to obtain the desired shape at the appropriate locations of the surface (steps 63 and 64, as indicated in FIG. 6).

A number of form parts are cast (step 61) in a common negative mold 60 and polished (step 62) to improve the optical quality of the surfaces before the molded part is bonded to the substrate (step 65) in a way that no optical discontinuity develops at the interface. This can be achieved by using adhesives with indices matched to those of the substrate and the form part. After the bonding process the laser diodes and photodetector assemblies 10, 11 are added to the form part and adjusted (step 66). A function test of the complete assembly can be performed either before or after the individual heads are separated (step 67) from each other by cutting.

Embodiments of the invention that do not use a substrate can be manufactured in one simple molding process, followed by insertion of the laser/photodetector assembly.

The imaging part of the read/write head of the present invention can also be used in isolation for other optical applications. The parallel beam leaving the plane exit surface of the imaging element shown in FIGS. 3A and 3B easily allows attaching other optical components so that an imaging system can be realized that has the following advantages: small size, long working distance, free working space, overhead clearance, insensitivity to high accelerations, and simple mass fabrication.

This imaging system is therefore suited in particular for manipulator and inspection systems.

While the invention has been particularly shown and described with reference to preferred embodiments thereof, it will be understood by those skilled in the art that various changes in form and details may be made therein without departing from the spirit and scope of the invention.

What is claimed is:

1. An optical system for imaging two conjugate planes comprising means including a transparent elongated body for guiding an optical light beam from one end thereof to the other end thereof by multiple internal reflections at given regions, and an imaging element including first and second series-arranged aspherical reflecting surfaces disposed on the surface of said transparent elongated body at said given regions, said second aspherical surface being arranged to deflect said beam in a direction perpendicular to the longitudinal axis of said transparent elongated body and to focus said beam outside of said transparent elongated body.

2. A read/write head for an optical storage system with a movable element having an information bearing surface which comprises:

means including a transparent elongated body for guiding an optical input beam and a beam reflected from said information bearing surface by internal reflections at multiple regions between a first end thereof disposed over said movable element and a second end thereof, said transparent elongated body including a relief-shaped surface having first and second aspheric reflection surfaces for focusing said beams, said second aspheric reflection surface being located at said first end of said transparent elongated body so as to deflect said optical input beam to an axis perpendicular to the longitudinal extension of said transparent elongated body, light emitting means disposed at said second end of said guiding means, light detection means disposed at said second end of said guiding means, and means including optical elements for controlling said beams disposed at said multiple regions of said guiding means.

3. A read/write head for an optical storage system with a movable element having an information bearing surface as set forth in claim 2 wherein said transparent elongated body includes a substrate having plane parallel surfaces and a form part having a relief-shaped surface and a plane surface bonded to said substrate and further including a polarizing beam splitter and a quarter-wave layer disposed at the interface between said form part and said substrate in the the path of said beams.

4. A read/write head for an optical storage system with a movable element having an information bearing surface, said movable element being a magneto-optical medium, which comprises a transparent elongated substrate for guiding an optical input beam and a beam reflected from said information bearing surface by internal reflections at multiple regions between a first end thereof disposed over said movable element and a second end thereof, said transparent elongated substrate including means disposed thereon having a reflection surface located at said first end so as to deflect said optical input beam to an axis substantially perpendicular to the longitudinal extension of said transparent elongated substrate, light emitting means disposed at said second end of said transparent elongated substrate, light detection means disposed at said second end of said transparent elongated substrate, means including optical elements for controlling said beams comprising one or more processed thin films disposed on said transparent elongated substrate at said multiple regions thereof, and means receiving said reflected beam and including a non-perfect polarizing beam splitter located in front of two crossed analyzers arranged under 45° with respect to said polarizing beam splitter for forming two auxiliary beams, said light detection means having associated photo detectors receiving said two auxiliary beams for generating a differential output signal.

5. A read/write head for an optical storage system with a movable element having an information bearing surface as set forth in claim 4 wherein said transparent elongated substrate includes flat surfaces at said multiple regions and said optical elements are diffractive elements.

6. A read/write head for an optical storage system with a movable element having an information bearing surface as set forth in claim 4 wherein said means for controlling said beams includes means having a grating arranged on the surface of said transparent elongated body for splitting said optical input beam into a main beam and two auxiliary beams which are laterally offset with respect to said main beam.

7. A read/write head for an optical storage system with a movable element having an information bearing surface as set forth in claim 4 further including means having a four-quadrant photo detector assembly arranged to receive the beam reflected from said information bearing surface for generating a focus control signal.

* * * * *